April 10, 1962     W. R. BAKER ETAL     3,029,199
PLASMA DEVICE
Filed May 20, 1958     2 Sheets-Sheet 1
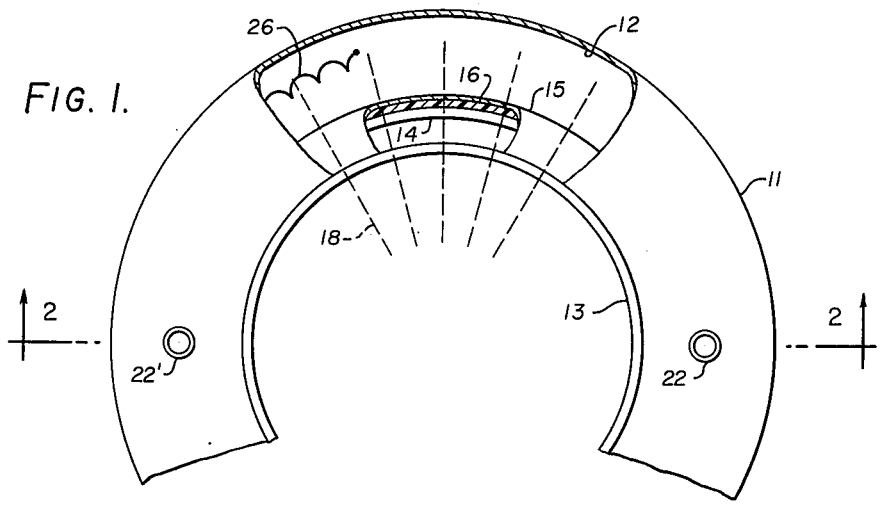
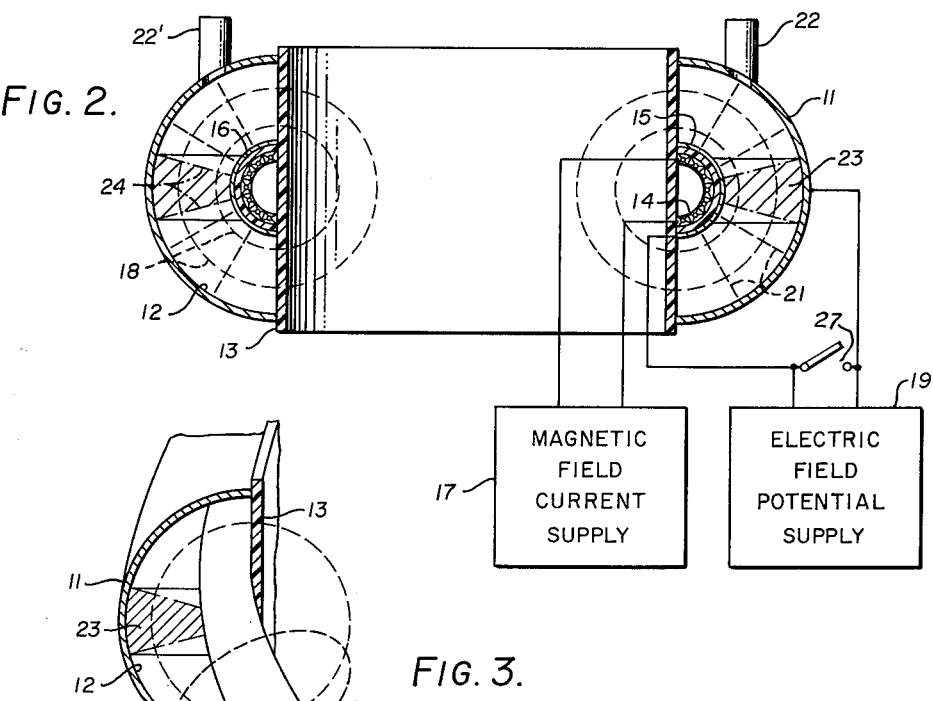
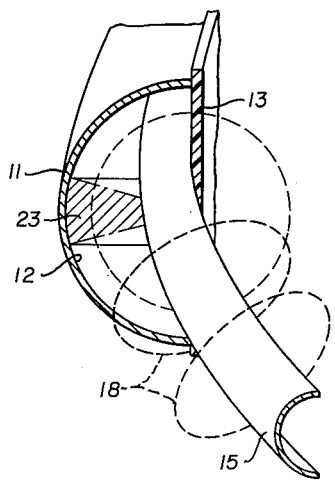
INVENTORS.
WILLIAM R. BAKER
HAROLD P. FURTH
BY ALEXANDER BRATENAHL
ATTORNEY.

INVENTORS.
WILLIAM R. BAKER
HAROLD P. FURTH
ALEXANDER BRATENAHL
BY
ATTORNEY

United States Patent Office 3,029,199
Patented Apr. 10, 1962

3,029,199
PLASMA DEVICE
William R. Baker, Orinda, Alexander Bratenahl, Livermore, and Harold P. Furth, Berkeley, Calif., assignors to the United States of America as represented by the United States Atomic Energy Commission
Filed May 20, 1958, Ser. No. 736,642
9 Claims. (Cl. 204—193.2)

The present invention relates, in general, to apparatus for establishing and maintaining a high energy, i.e., high temperature, rotational plasma and more particularly to plasmas of light elements for various purposes.

The invention is related to the subject matter of the copending applications of William R. Baker, filed June 26, 1957, Serial No. 668,271, now abandoned, and to the application of William R. Baker et al., filed May 20, 1958, Serial No. 736,647, now Patent 2,997,641, dated August 22, 1961.

It has been predicated that the achievement of a useful controlled fusion reaction may depend upon the creation and confinement of high temperature plasmas from certain light elements and that such reactions may provide a solution to the world's increasing need for energy, and considerable effort has been directed toward attaining such a goal. The dwindling supply of fossil fuels such as coal and oil, together with the limited supply of fissionable fuels and the attendant hazards attached to the use thereof, make the successful development of some new energy source such as the fushion reactors imperative for sustaining the continued growth of civilization.

In general, for the hydrogen isotopes, a fusion reaction consists of the process wherein two nuclei combine to form a heavier nucleus, resulting in the release of considerable energy and the emission of a neutron or proton. The Coulomb barrier which surrounds each nucleus is a strong repelling force tending to prevent combination of nuclei. By imparting sufficient relative velocities to the nuclei to overcome such repelling force, a fushion reaction may occur with resultant release of energy. However, the necessary nuclear particle velocities may correspond to a kinetic temperature of 100,000,000° centigrade or more.

It becomes apparent that at temperatures of the order necessary for fusion reactions, the fuel nuclei cannot be contained in ordinary vessels but requires the usage of some containment means such as a magnetic field which is not destroyed by extreme temperatures and which introduces no contaminants into the fuel. Concomitant with containment of the nuclei or ions it is necessary to impart sufficiently high relative velocities to the nuclei to attain the temperature required for overcoming the repelling Coulomb force. However, plasmas heated to lower temperatures may be utilized for other purposes including that disclosed below similarly to the device disclosed in application Serial No. 736,647 mentioned above.

The present invention provides such a device for simultaneously containing and heating a fuel. At the temperatures to be considered here the fuel will be completely ionized, forming a plasma containing free electrons and positive ions, the binding force between the electrons and the nuclei being inconsequential at such temperatures. The plasma is rapidly rotated as in a homopolar motor by the combined forces of an electric field which is everywhere orthogonal to the magnetic field. An outward bulge in the magnetic field is created to form a plasma containment trough, the plasma being held in the magnetic field trough by centrifugal force. The fuel is heated by the combined action of centrifugal and magnetic forces, the centrifugal force impelling the charged particles against the magnetic field which imparts cycloidal orbits to the particles, enhancing the possibility of thermalizing particle collision, that is, those particle collisions which convert ordered kinetic energy into heat energy. Thus, the centrifugal force holds the particles in the magnetic trough while the rotational kinetic energy is converted to plasma heating by viscosity or turbulent mixing. Since a generally annular vacuum chamber is employed to contain the above fields, the centrifugal force is further utilized to hold the plasma away from the inner insulating walls of the device, preventing bombardment of the insulation material by particles and thereby avoiding electrical breakdown. It has been found, moreover, that the invention may be caused to function in a manner equivalent to an electrical capacitor, storing large quantities of electrical energy in a relatively small volume.

It is an object of the present invention to provide an improved fusion reactor.

It is another object to provide a means utilizing a combination of electric, magnetic and resultant centrifugal forces for containment and heating of a fuel.

It is also an object to provide a means for storing electrical energy at high energy densities.

It is a further object to provide an energy discharge means having a very short discharge pulse rise time.

The operation of the invention will best be understood by reference to the following specification taken in conjunction with the accompanying drawing, in which:

FIGURE 1 is a plan view drawing of a plasma containment device with portions thereof being broken out;

FIGURE 2 is a sectional view taken along line 2—2 of FIGURE 1;

FIGURE 3 is a perspective view showing portions of the apparatus and showing the configuration of magnetic field lines in the plasma containment device;

Figure 4:
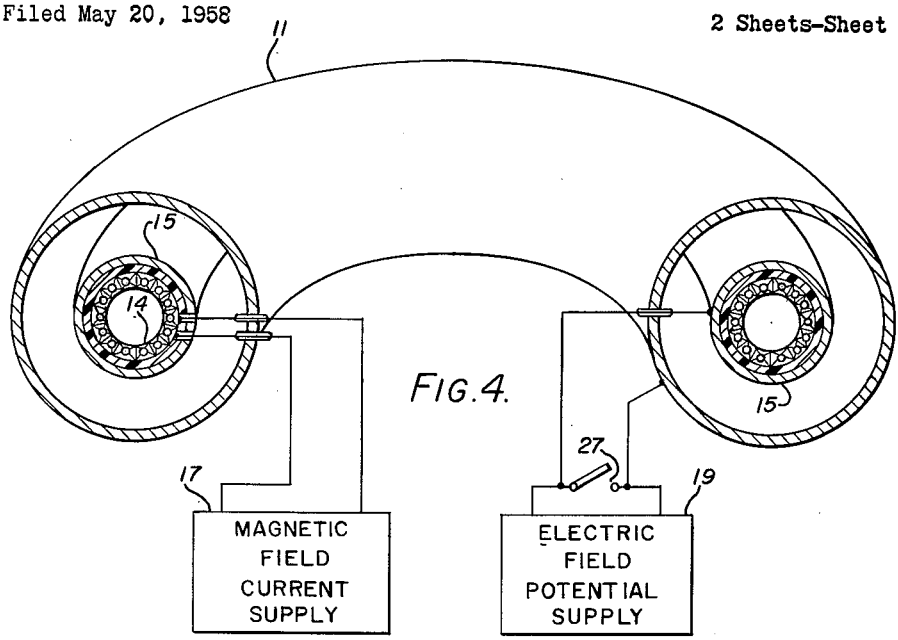
FIGURE 4 is a partial cross-sectional view indicating a modification of the electrode arrangement of the device of FIGS. 1 and 2.

Referring now to the drawing and particularly to FIGURE 1 and FIGURE 2, there is shown an annular outer electrode 11, composed of a highly conductive material such as copper and having a semi-circular cross section concave towards the center of revolution, thereby forming the outer wall of an annular chamber 12. The outer electrode 11 is electrically a shorted single turn coil.

A hollow cylindrical insulator 13 is disposed coaxially within the outer electrode 11, functioning as an inner wall to enclose the chamber 12 and lying on a central plane of the electrode 11. An annular coil 14 is symmetrically disposed at the center of the semi-circular chamber 12 and adjacent to the cylindrical insulator 13. The coil 14 is wound from heavy copper or similar material and may include provision for circulation of cooling liquids therethrough by utilizing a hollow conductor coupled to a conventional source of cooling liquid. The turns of the coil 14 are separated by suitable insulation. An annular electrically conductive inner electrode 15 of semi-circular cross section is disposed over the surface of the coil 14 to protect it from bombardment by charged particles in the chamber 12 and so that a single voltage potential is present over the surface exposed to the chamber 12. The annular insulator 13 also defines what may be termed the plane of the inner electrode 15 to insulate same from the outer electrode 11. The electrode 15 is electrically insulated from the coil 14 by insulation 16 and to avoil disturbing the magnetic field by acting as a closed conductor loop, the surface cover or electrode 15 is made quite thin so that appreciable magnetic flus penetration occurs at the fast pulse rise time used in the embodiment of the invention described here. A magnetic field current supply 17 is connected to the ends of the coil 14 so that an intense magnetic field may be created thereabout having the configuration indicated in FIGURE 2 by magnetic field lines 18, the indicated field being similar to the magnetic field within a longitudinal half section of a coaxial cable.

An electric field potential supply 19 is connected from the electrode 15 to the outer electrode 11 so that electric field lines 21 are created therebetween perpendicular or orthogonal to the magnetic field while the inner electrode 15 and the outer electrode 11 function to produce an electric field. The configuration of both the magnetic field lines 18 and electric field lines 21 are similar to those created in one half of a standard coaxial line. Conventional gas inlet and outlet fittings 22 and 22' are provided by which a suitable ionizable gas may be introduced into the chamber 12 and in those circumstances wherein fusion reactions are to be carried out the gas should be capable of fusion, such as deuterium. Vacuum seal means are provided at all the junctures between components of the apparatus where necessary to maintain vacuum tight integrity of the chamber 12.

Considering now the operation of the invention, assume that a gas such as deuterium has been introduced into the chamber 12. Power from the magnetic field current supply 17 is applied first to the coil 14 to create a strong magnetic field therearound as described. A high potential from the electric field supply 19 is then applied, creating an electric field across the chamber 12 and rapidly ionizing the gas into a plasma comprised of both positively charged ions and negatively charged electrons. Thus the electric field potential supply 19 also must provide sufficient current for the gaseous discharge. The condition existing within the chamber is, at first, a heavy gaseous discharge wherein the potential drop between the electrodes is held to a relatively low value. There is an initial very large surge of current which principally results from the massive displacement of positive ions toward the negative electrode in response to the electric field, the electron displacement being relatively less than the position ion. However, in moving toward the negative electrode, that of the positive ions must cross magnetic field lines so that an azimuthal force is exerted on the ions in a direction perpendicular to the original ion displacement.

A similar force is exerted on the electrons in the same direction as the positive ions, thus the entire plasma proceeds in an azimuthal orbit around the chamber 12. In general, the force exerted on the plasma is comparable to the force exerted on a current carrying conductor disposed in the magnetic field between the pole faces of a powerful magnet, leading to the use of "homopolar" as a descriptive term for the present invention, since the reactor is somewhat analogous to a motor with a homopolar configuration. While the individual ions progress along more complex orbits, the overall effect is a rotation of the plasma in an azimuthal orbit around the chamber 12. Such rotational motion causes an outward centrifugal force to be developed, but the magnetic field 18 acts as an effective restraining force to the passage of plasma radially outward across the magnetic field 18 in response to such centrifugal force. However, there is no restraint on plasma motion in a direction parallel with the magnetic lines 18, thus the outwardly directed centrifugal force causes the ions to concentrate in the region radially outward from the inner electrode 15 within a confining region or volume 23 enclosed by the indicated plasma boundary lines 24. The plasma is impelled outward toward the furthest possible region away from the center of rotation without crossing the magnetic field lines 18. Since the magnetic field lines 18 within the chamber 12 have a curved configuration, the plasma is concentrated by centrifugal action into the region 23.

A further force tending to contain the plasma in the region 23 is present in the magnetic mirrors created by the magnetic field 18. In general, a magnetic mirror as defined here occurs wherever lines of magnetic force tend to converge. Such magnetic configuration acts to repel charged particles from the region of high density field to the region of lower density. The magnetic mirror effect is described further on pages 27–34 of the book "Cosmical Electrodynamics" by H. Alfven, published by Oxford University Press in 1953. When the motion of a charged particle brings such particle into a region of high magnetic field density, a component of force is exerted on the particle which tends to drive the particle out of the region of high magnetic field density back in the direction from which it came. Thus charged particles passing from a region of low magnetic field into a region of high magnetic field tend to be returned to the lower density field, the process being broadly comparable to the action of an optical mirror in reflecting light. Two such magnetic mirrors are disposed in a facing relationship in the present invention, that is, there are two regions of high magnetic density separated by region of lower magnetic density. Charged particles originally in the low magnetic field region are entrapped therein since particles which enter the higher density magnetic field tend to be deflected back into the lower density field region by the mirror action.

Referring now to FIGURES 1 and 3 there is shown the means by which such a mirror is formed. In FIGURE 3 the outer electrode 11, the cylindrical insulator 13 and the inner electrode 15 are shown in perspective. The magnetic lines 18 which exist around the inner electrode 15 when current is passed therethrough are more closely spaced at the radially inward side than at the radially outward side. It will be readily ascertained that the magnetic lines 18 are least concentrated in the space located diametrically outward from the annular inner electrode 15, corresponding to the region 23. Thus both the mirror forces and centrifugal force act to contain the plasma in the region 23. The mirror effect will also aid in preventing energetic plasma particles from escaping inward toward the insulator 13.

If a magnetic mirror field exists without the centrifugal force, particles having a low component of velocity perpendicular to the magnetic field lines may escape through the mirror field. The centrifugal force entraps particles having the lower velocity component which particles might otherwise escape through the mirror field. Thus the two forces coact to contain many more particles than possible with either one of the forces acting alone.

The physical configuration of the invention has been arranged with a view toward preventing bombardment of the cylindrical insulator 13 by removing the energetic plasma particles from the vicinity of the insulator. The insulating properties of the insulator 13 would be deleteriously affected by such bombardment and contaminants would be released into the chamber 12.

Consider now the processes by which the plasma is heated whereby the relative velocity of particles within the plasma is increased to overcome the repelling Coulomb force existing between ions. One plasma heating factor is a velocity gradient which exists along the radius of the reactor, the plasma proximal to the inner electrode 15 having a higher rotational velocity than the plasma nearer the outer electrode 11, such velocity variation being approximately proportional to the reciprocal of the radius. Owing to the annular physical configuration of the inner electrode 15 and outer electrode 11, the azimuthally directed force exerted upon the plasma by the magnetic field decreases as the orbital radius increases owing to the decreasing concentration of electric field lines as the distance from the inner electrode 15 increases. A particular segment of plasma will have a rotational velocity dependent upon the radial position. Radially inward and outward adjoining plasma segments will have greater and lesser rotational velocities respectively, thereby introducing a frictional or viscous drag effect between the plasma segments.

The viscosity heating is greatly intensified by cycloidal orbits of the individual ions. Each ion may be considered to have an average circular guiding center orbit around the reactor, but the ion actually traverses a much more complex cycloidal or Larmor path comprising oscillatory radial departures on either side of the guiding center orbit, as typified by an orbit path 26 of FIGURE 1. As previously described, ions having different guiding center radii will have different rotational velocities, but owing to the fine structure cycloidal path of the ions an individual ion will encounter other ions having other guide center orbits and different rotational velocities. The cycloidal path followed by any particular ion will depend upon the random direction and velocity of the ion at the moment the electric field is applied. Considerable kinetic energy is transferred in the viscous heating process by interaction between ions, resulting in heating of the plasma. The rotational velocity of the plasma decreases as more of the rotational energy is converted to kinetic heat energy.

A still further effect tending to concentrate the plasma in the region 23 is the pinch force wherein parallel conductors having a common direction of current flow will produce a resultant magnetic field tending to physically concentrate the conductors into a minimum cross-sectional area. When the electric field is first applied, there is a displacement current as previously discussed. Such current creates an initial pinch force which tends to concentrate the plasma into the region 23. While such displacement current pinch effect is of importance only at the outset of operation, it is beneficial since it contains and compresses the plasma at a time before the full centrifugal force is obtained.

The equilibrium velocity of plasma rotation is given by:

$$v_e = \frac{c}{H}\left(E + \frac{mv_e^2}{er}\right)$$

where:

$v_e$ = rotational velocity of plasma
$c$ = speed of light
$H$ = magnetic field through volume 23
$E$ = electric field
$m$ = mass of particle
$r$ = radius of plasma
$e$ = charge of a plasma particle The second term will result in a slightly different velocity for ions than for electrons owing to the different sign of the charge $e$ for electrons and ions. This difference in velocity for oppositely charged particles results in an azimuthal electric current. Since the plasma is a low resistance conductor, the azimuthal electric current may be very large, the resultant additional magnetic field produced thereby aiding in containing the plasma in the region 23 both by an axial pinch force and by distortion of the perpendicular magnetic field to deepen the magnetic trough. The pinch force, while not alone sufficient to effectively contain the plasma, thus aids the plasma containment. Inasmuch as the conductivity of the plasma is finite, there will be a slow outward drift of plasma across the magnetic field lines 18. Although such drift diminishes as the temperature of the plasma increases, such drift current adds to the overall heating effects.

In addition to the inherent heating mechanisms, additional heating methods may be employed to enhance the velocity gradient through the plasma so that the relative velocity differential of adjacently disposed plasma segment is maximized. Superimposing a rapidly oscillation component on the radial electric field can set up a standing hydromagnetic half-wave in a direction along magnetic field line. The viscous drag created by the associated velocity gradients along field lines is large and results in a rapid conversion of directed kinetic energy into heat energy. Velocity gradients may also be obtained by perturbating the cylindrical symmetry of the electrodes.

Although the direction of drift is the same for both negatively and positively charged particles, the radial displacements of the ions and electrons are in opposite directions, similar to the displacement phenomenon in a dielectric. Thus, the present invention is useful not only for heating a plasma, but may also be utilized as capacitive energy storage means. The charging and discharge currents associated with the invention are similar to those obtainable with a large high quality capacitor having very low inductance, producing output current pulses having very rapid rise times. To operate the invention as a capacitor connected across the electric field potential supply 19, a rotating plasma is established in the manner previously described. Such process is comparable to the capacitor charging process for a conventional capacitor, the current and voltage waveforms having phase relationships similar to that of conventional capacitor current and voltage waveforms. The kinetic energy of the rotating plasma is the analogue of the quantity ½ $CV^2$ for the total energy stored in an ordinary capacitor where:

$C$ = capacitance
$V$ = applied voltage

The integral of the motion, the plasma angular momentum is the analogue of the conventional capacitor charge equation, $Q = CV$. The dielectric constant of the homopolar capacitor is given by $$K = 1 + \frac{4\pi \rho c^2}{H^2}$$

where:

$K$ = dielectric constant
$\rho$ = plasma density
$c$ = velocity of light
$H$ = value of perpendicular magnetic field through the region 23

Values of energy density are readily attainable exceeding by orders of magnitude the maximum energy density possible with ordinary capacitors, making it possible to concentrate large quantities of electrical energy into a small volume. Very short pulse rise times to high energies are thus attainable since the energy transit time across the capacitor is short and very short connecting cables may be utilized, thereby minimizing inductive components.

After a rotating plasma has been established, the capacitor behavior may be utilized for further compression and heating by rapidly disconnecting the electric field potential supply 19 and suddenly applying a short circuit connection from the inner electrode 15 to the outer electrode 11 as by means of switch 27. The resulting very high current through the external short circuit produces a similar high current in the plasma and this high current produces a pinch effect operating on the plasma, thereby further heating and compressing the plasma.

Figure 5:
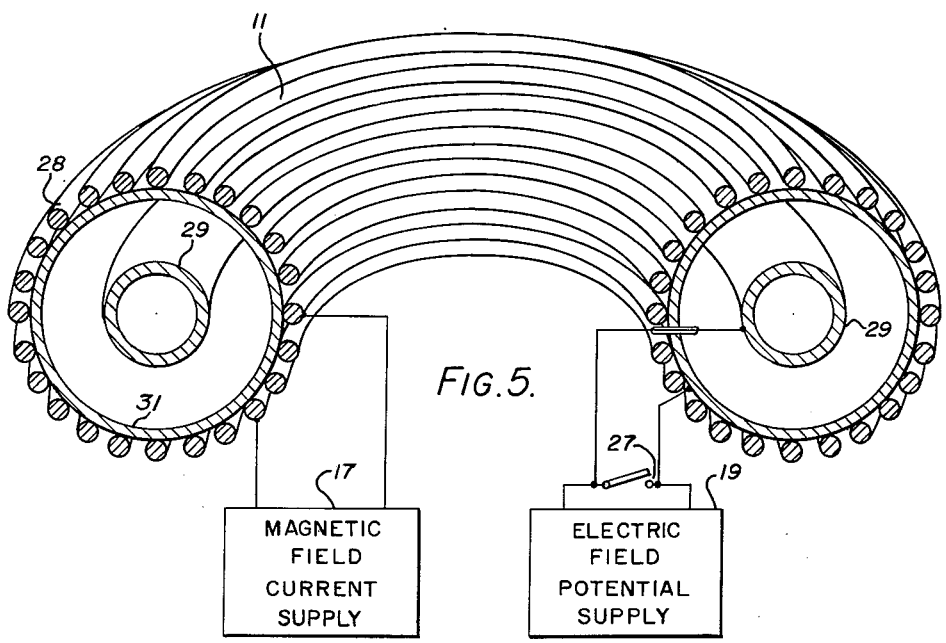
FIGURE 5 is a partial cross-sectional view of a second modification of the electrodes and magnetic field coils of the device of FIGS. 1 and 2.

In other embodiments of the invention, the outer electrode 11 as shown in FIG. 4 of the drawing is a torus which coaxially encloses the inner electrode 15 inclosing coil 14 also of annular toroidal construction. Such a construction is structurally more rigid than that shown in FIGURES 1 and 2, but access to the inner electrical connectors is made more difficult thereby. In still other embodiments of the invention, as shown in FIG. 5, the outer electrode is made in the form of a single or multiple turn coil 28 wound upon an annular electrode member 31 generally corresponding to electrode 11, described above. The high current is then passed through the outer electrode coil to produce a magnetic field. The inner electrode in such an embodiment of the invention is made in the form of a continuous annular ring 29 or a coil as described. It is further possible to combine the functions of the annular coil 14 and the inner electrode 15 into a single electrode, the electric field potential supply and magnetic field current supply each having a common connection to such electrode.

While the invention has been disclosed in detail with respect to a single preferred embodiment, it will be apparent to those skilled in the art that numerous variations and modifications may be made within the spirit and scope of the invention and thus it is not intended to limit the invention except as defined in the following claims.

What we claim is:

1. In a rotating plasma device, the combination comprising an inner annular shell electrode having an outer convex surface and being constructed of thin conductive material capable of penetration by a rapidly rising magnetic field, an outer annular electrode concentric with said inner electrode with a concave surface facing the convex surface thereof and defining an annular chamber therebetween, a high voltage source coupled across said electrodes to produce an electric field therebetween within said chamber, means including a solenoid disposed concentrically within said annular electrode for producing a magnetic field perpendicular to said electric field within said chamber, and subatmospheric gas supply means coupled to said chamber for supplying an ionizable gas thereto.

2. The device as defined in claim 1 wherein said convex and concave surfaces of said inner and outer electrodes, respectively, are substantially semi-circular in configuration.

3. The device as defined in claim 1 wherein said convex and concave surfaces of said inner and outer electrodes, respectively, are substantially semi-circular in configuration and said surfaces are everywhere equidistant.

4. In a rotating plasma device, the combination comprising an inner annular shell electrode having an outwardly facing convex surface of substantially semicircular configuration and being constructed of thin conductive material capable of penetration by a rapidly rising magnetic field, an outer annular electrode disposed concentrically about said inner electrode and having a concave substantially semicircular surface facing and spaced equidistant from said convex surface of the inner electrode, said surfaces defining an annular chamber therebetween, means including a solenoid constructed with a semicircular shell configuration disposed concentrically within said inner electrode for producing a magnetic field in said chamber, a high voltage power source coupled across said inner and outer electrodes to establish an electric field in said chamber, and means for supplying ionizable gas at subatmospheric pressure to said chamber.

5. The device as defined in claim 4, wherein insulation means is attached and extends between the marginal edges of said inner and outer electrodes, whereby said chamber is hermetically sealed.

6. In a rotating plasma device utilized for electrical energy storage, the combination comprising an inner annular shell electrode having an outer convex surface and being constructed of thin conductive material capable of penetration by a rapidly rising magnetic field, an outer annular electrode concentric with said inner electrode with a concave surface facing the convex surface thereof and defining an annular chamber therebetween, a high voltage source coupled across said electrodes to produce an electric field in said chamber, means including a solenoid disposed concentrically within said inner electrode for producing a magnetic field perpendicular to said electric field in said chamber, means for introducing ionizable gas at subatmospheric pressure into said chamber, and means including a high current switch connected from the inner to the outer electrode and adapted to rapidly discharge electrical energy stored in the rotating plasma produced in the device.

7. The device as defined in claim 6 wherein said electrode surfaces are semicircular in configuration and are spaced everywhere substantially equidistant.

8. The device as defined in claim 6 wherein said electrode surfaces are semicircular in configuration and insulator means is attached and extends between the marginal edges of said electrodes so as to hermetically seal said chamber.

9. The device as defined in claim 6 wherein said solenoid has a shell configuration corresponding to the convex surface of said inner electrode.

References Cited in the file of this patent

UNITED STATES PATENTS

| | | |
|---|---|---|
| 930,212 | Moscicki | Aug. 3, 1909 |
| 2,330,849 | Smith | Oct. 5, 1943 |
| 2,499,289 | Backus | Feb. 28, 1950 |
| 2,499,320 | Loevinger | Feb. 28, 1950 |
| 2,636,990 | Gow | Apr. 28, 1953 |
| 2,728,877 | Fischer | Dec. 27, 1955 |
| 2,826,709 | Von Ardinne | Mar. 11, 1958 |